US012771531B2

(12) United States Patent
Paganucci et al.

(10) Patent No.: US 12,771,531 B2
(45) Date of Patent: Oct. 20, 2026

(54) SYSTEMS AND METHODS FOR FACILITATING ANONYMOUS META VERSE ACTIONS

(71) Applicant: AlphaPortal, LLC, Marietta, GA (US)

(72) Inventors: Steve Paganucci, Marietta, GA (US); Mike Love, Austin, TX (US); Blake Love, Austin, TX (US)

(73) Assignee: AlphaPortal LLC, Marietta, GA (US)

( * ) Notice: Subject to any disclaimer, the term of this patent is extended or adjusted under 35 U.S.C. 154(b) by 0 days.

(21) Appl. No.: 18/467,335

(22) Filed: Sep. 14, 2023

(65) Prior Publication Data

US 2024/0097889 A1 Mar. 21, 2024

Related U.S. Application Data

(60) Provisional application No. 63/407,540, filed on Sep. 16, 2022.

(51) Int. Cl.
*H04L 9/08* (2006.01)

(52) U.S. Cl.
CPC .......... *H04L 9/0847* (2013.01); *H04L 9/0825* (2013.01)

(58) Field of Classification Search
CPC ............................ H04L 9/0847; H04L 9/0825
USPC .......................................................... 713/171
See application file for complete search history.

(56) References Cited

U.S. PATENT DOCUMENTS 7,213,032 B2 5/2007 Mascarenha
8,566,247 B1 10/2013 Nagel et al.
8,646,103 B2 2/2014 Jakobson et al.
9,419,951 B1 8/2016 Flesher
9,864,989 B2 1/2018 Hutchison et al.
11,366,916 B1 6/2022 Caplovitz
12,114,150 B2 * 10/2024 Naujok ................. H04W 12/66
12,235,977 B2 2/2025 Caplovitz
12,278,902 B1 4/2025 Dave
12,284,294 B1 4/2025 Bandyopadhyay
2002/0095375 A1 * 7/2002 Taneda ................... G06Q 30/02 705/39
2006/0178966 A1 8/2006 Jung et al.
(Continued)

OTHER PUBLICATIONS

Chen et al., “Metaverse-The New Reality.” May 2018, 35 Pages.
(Continued)

*Primary Examiner* — Moeen Khan
(74) *Attorney, Agent, or Firm* — Andrew M. Gabriel

(57) ABSTRACT

A method for implementing an arbiter module includes cryptographically binding a true identity for a particular real-world individual to an arbiter module and cryptographically binding one or more real-world entities to the arbiter module. The one or more real-world entities store third party information associated with the particular real-world individual. The method also includes cryptographically communicating one or more data packages, which include the third-party information, from the one or more real-world entities to the arbiter module. The method also includes cryptographically binding one or more metaidentities to the arbiter module such that the third-party information associated with the particular real-world individual is at least partially attributable to the one or more metaidentities via the arbiter module for facilitating one or more metaverse actions within the one or more metaverses without revealing the true identity that is bound to the arbiter module.

21 Claims, 14 Drawing Sheets

(56) References Cited

U.S. PATENT DOCUMENTS

| | | | | |
|---|---|---|---|---|
| 2012/0278614 | A1 | 11/2012 | Choi | |
| 2017/0323483 | A1* | 11/2017 | Palmaro | G06T 19/20 |
| 2022/0114542 | A1 | 4/2022 | Choi | |
| 2022/0116231 | A1 | 4/2022 | Choi | |
| 2022/0122062 | A1 | 4/2022 | Mayblum et al. | |
| 2023/0396450 | A1* | 12/2023 | Tartan | H04L 9/3268 |
| 2024/0028675 | A1* | 1/2024 | Merdassa | G06F 21/31 |
| 2025/0037097 | A1* | 1/2025 | Peden | G06Q 20/4014 |

OTHER PUBLICATIONS

Far et al., "Applying Digital Twins in Metaverse: User Interface, Security and Privacy Challenges." Journal of Metaverse, vol. 2, Issue 1, (2022), pp. 8-16.

Harwick et al., "What's holding back blockchain finance? On the possibility of decentralized autonomous finance." The Quarterly Review of Economics and Finance, Sep. 4, 2019, 29 Pages.

Kappe et al., "The Open Metaverse Currency (OMC)—A Micropayment Framework for Open 3D Virtual Worlds." International Conference on Electronic Commerce and Web Technologies. Springer, Berlin, Heidelberg, Sep. 2010, 11 Pages.

Linden, Age and Identity Verification in Second Life, https://lindenlab.wordpress.com/2007/05/04/age-and-indentity-verification-in-second-life/ (May 4, 2007) (3 pages).

Linden, More on Age Verification, https://lindenlab.wordpress.com/2007/12/09/more-on-age-verification/ (Dec. 9, 2007 (1 page).

Nieva et al., Worldcoin Promised Free Crypto If They Scanned Their Eyeballs With "The Orb." Now They Feel Robbed, https://www.buzzfeednews.com/article/richardnieva/worldcoin-crypto-eyeball-scanning-orb-problems, BuzzFeed News, Apr. 5, 2022 (17 pages).

Guo et al., Deception, exploited workers, and cash handouts: How World recruited its first half a million test users, MIT Technology Review, https://www.technologyreview.com/2022/04/06/1048981/worldcoin-cryptocurrency-biometrics-web3/, Apr. 6, 2022 (34 pages).

* cited by examiner

SYSTEMS AND METHODS FOR FACILITATING ANONYMOUS META VERSE ACTIONS

CROSS-REFERENCE TO RELATED APPLICATIONS

This application claims the benefit of and priority to U.S. Provisional Patent Application Ser. No. 63/407,540 filed on Sep. 16, 2022 and entitled "SYSTEMS AND METHODS FOR FACILITATING ANONYMOUS METAVERSE ACTIONS CROSS-REFERENCE TO RELATED APPLICATIONS," which application is expressly incorporated herein by reference in its entirety.

BACKGROUND

People may desire to utilize one or more metaidentities and "exist" in the Metaverse for various reasons. Many people may seek to decouple their metaidentities from reality to anonymously (with respect to true identity) and independently operate within the Metaverse.

Although many individuals utilize the Metaverse for social, intellectual, and/or entertainment interactions, the Metaverse will likely experience ever-expanding commercialization that incorporates transactions internal to or within the constructs of a particular Metaverse, across Metaverses, and/or in a manner that bridges the Metaverse with actual reality. Thus, individuals' metaidentities may eventually coexist with their true identity as independent and valid participants in commercial markets both within meta-environments and in actual reality.

Effectively obscuring the link between a person's true identity and their metaidentity/metaidentities is associated with many challenges.

The subject matter claimed herein is not limited to embodiments that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

DETAILED DESCRIPTION

Figure 1:
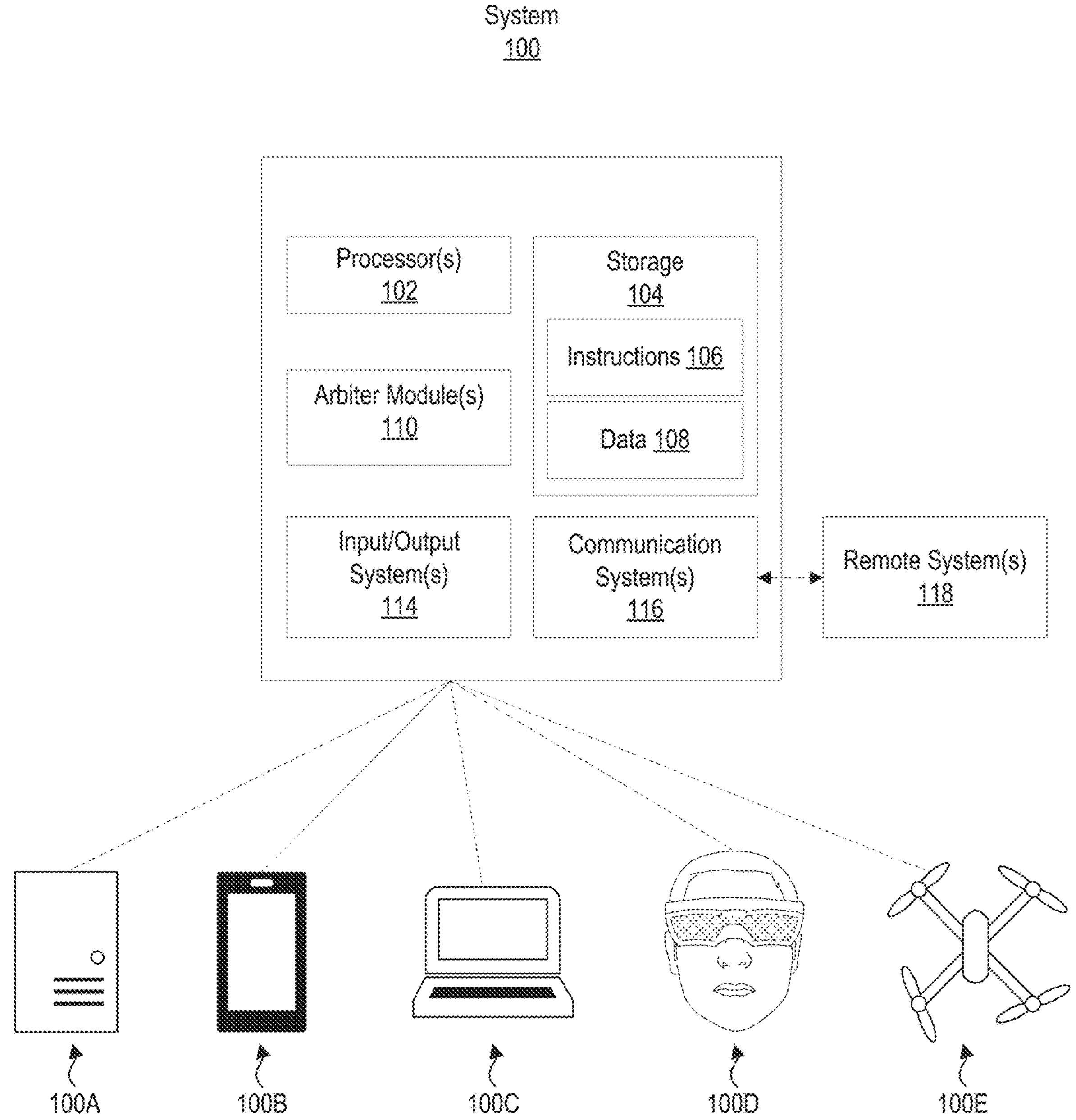
FIG. 1 illustrates example components of a system that may comprise or implement one or more disclosed embodiments.

As noted above, effectively obscuring the link between a person's true identity and their metaidentity/metaidentities is associated with many challenges. The practice of "doxing," (e.g., uncovering and exposing/publishing the true identity of a real person behind an anonymous metaidentity for the purpose of harassment) has ever become more en vogue and has a chilling effect on those seeking anonymous expression and/or unrestricted speech in the Metaverse.

In many cases, data to linkages between a virtual and true identity result from participating in commerce or engaging in other services that require an individual while in a virtual role (e.g., within a Metaverse) to provide verifiable information about their true identity (telephone number, physical address, credit card number, etc.). One fundamental and persistent link that connects true identity and metaidentity is payment for goods/services. Though there may be a future where a robust decentralized and anonymous cryptocurrency economy is established, legacy payment and credit systems rooted in fiat currency will likely remain the status quo for many years to come.

Accordingly, unless great care is taken by individuals with a high degree of technical skill and/or through the commission of illegal activity, it is very difficult to engage in any type of anonymous virtual commerce, especially on any type of scale or frequency.

As used herein, the "Metaverse" refers to any of the multitude of digital, virtual, and/or artificial environments that incorporate or mimic various aspects of reality. The Metaverse encompasses all manner of indirect digital interaction from the simple use of online monikers to any of the existing or possible future immersive artificial environments, communities, or "worlds." The Metaverse may be regarded as an analog to the real world instituted for commercial interaction, social interaction, and/or for other purposes (e.g., for gaming, skill development, training, instruction, and/or others). As used herein, the term "environment" includes all possible permutations of the Metaverse as well as reality itself.

As used herein, "identity" refers to the various metrics and information that are used to define one's uniqueness from a social and/or commerce perspective (e.g., Name, date of birth, social security number, biometric data, etc.). Each unique individual or person has a singular actual or "true identity" and may potentially be associated with one or more "virtual" or "meta" identities. As used herein, the term "metaidentity" represents alter-identities that may be controlled, actioned, operated on by or on behalf of an actual person.

At least some disclosed embodiments involve a systemized and secure process to multi-directionally pass information between reality and various Metaverse environments while maintaining identity connectivity anonymously. Disclosed embodiments implement an arbiter module (which may be regarded as a "blind arbiter") that manages or facilitates the anonymous transition of information between or among environments.

In some implementations, the arbiter module binds identities from different environments together and allows the mutual sharing of information related to those identities without revealing the relationship between those identities to any third party (e.g., real-world third parties and/or metaverse third parties). The information transferred can be of any type including static information or dynamically updated information (e.g., real-time streamed information).

In some instances, the arbiter module enforces a one-to-many relationship, such that a singular true identity may be bound to an infinite number of metaidentities. Reciprocally, in some instances, a metaidentity may only be linked to a single true identity and no other. By way of example, an individual may have multiple metaidentities that may appear uncorrelated to any observer, however the arbiter module (via common association with the true identity) may indirectly comprehend the linkage between the metaidentities.

Implementation of an arbiter module as described herein may enable cross-environmental association between real-world and metaverse identities that is only know to the arbiter module (and presumably to the owner of the true identity). Such functionality may advantageously enable real-world individuals to control one or more metaverse identities to participate in meaningful metaverse activities in an anonymous manner. Such functionality may additionally promote the meaningful growth and/or establishment of metaverse identities (e.g., in view of their externally anonymous association with a real-world individual). Although implementation of an arbiter module may secure anonymity from a process perspective, it should be noted that anonymity is not guaranteed in view of actions that may be performed by the owner of the true identity that could compromise anonymity.

Having just described some of the various high-level features and benefits of the disclosed embodiments, attention will now be directed to FIGS. 1 through 14. These Figures illustrate various conceptual representations, architectures, methods, and supporting illustrations related to the disclosed embodiments.

FIG. 1 illustrates various example components of a system 100 that may be used to implement one or more disclosed embodiments. For example, FIG. 1 illustrates that a system 100 may include processor(s) 102, storage 104, input/output system(s) 114 (I/O system(s) 114), and/or communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feedforward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

FIG. 1 conceptually represents that the components of the system 100 may comprise or utilize various types of devices, such as, by way of non-limiting example, server 100A, mobile electronic device 100B (e.g., a smartphone), personal computing device 100C (e.g., a laptop), a mixed-reality head-mounted display 100D (HMD 100D), aerial vehicle 100E (e.g., a drone), and/or other devices (e.g., one or more cloud infrastructures).

FIG. 1 furthermore illustrates arbiter module(s) 110, which may comprise computer-readable or -executable components and/or hardware components configured to carry out various actions/tasks (e.g., information transformation/modification, management, communication, storage, encryption/decryption, etc.) described herein for facilitating or enabling metaverse actions based on real-world information in an anonymized manner (and/or updating real-world information based on metaverse actions). For example, arbiter module(s) 110 may comprise an automated controller and/or processor that may be instituted or operated by a decentralized autonomous organization (DAO) (e.g., utilizing a blockchain) or similar self-governing structure (or by a commercial or government entity). Arbiter module(s) 110 may comprise, implement, or interact with any components of the system 100 as shown in FIG. 1.

Figure 2:
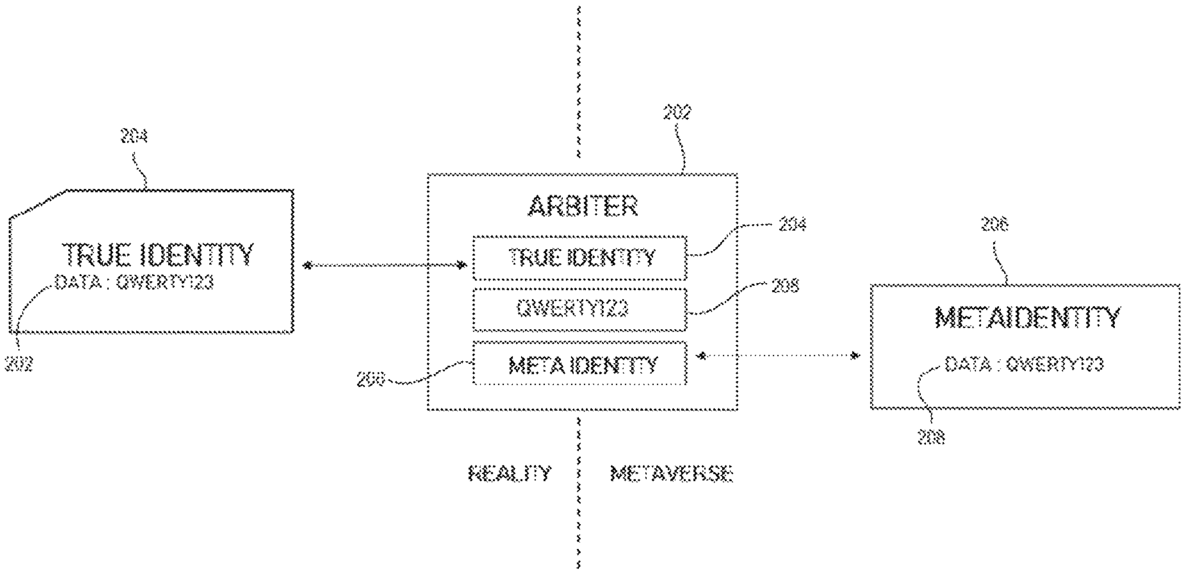
FIG. 2 illustrates a conceptual representation of an arbiter module facilitating inter-environment sharing of data in an anonymous manner.

FIG. 2 provides a conceptual representation of an arbiter module 202 (labeled "ARBITER" in FIG. 2, corresponding to arbiter module(s) 110) facilitating inter-environment sharing of data in an anonymized manner. FIG. 2 depicts REALITY (e.g., the real-world environment) and METAVERSE (e.g., one or more metaverse environments) on opposing sides of a dashed line, indicating the existent divide between the real-world environment and metaverse environments. As depicted in FIG. 2, the arbiter module 202 may anonymously link a true identity 204 and a metaidentity 206 to facilitate association of data 208 of (or about) the true identity 204 with the metaidentity 206 without allowing the true identity 204 to become known within the metaverse (as indicated in FIG. 2 by the double-headed arrows extending between (i) the representations of the true identity 204 and the metaidentity 206 within the arbiter module 202 and (ii) the representations of the true identity 204 and the metaidentity 206 within their respective environments).

In some implementations, an arbiter module may incorporate asymmetric encryption and/or hierarchical deterministic (HD) wallet techniques to positively link identities and attributes. The following discussion provides one or more examples of implementing/leveraging such technologies, and variations thereon are within the scope of the present disclosure.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
FIG. 3 illustrates an example flow diagram depicting acts associated with implementing an arbiter module.

FIG. 3 illustrates an example flow diagram 300 depicting acts associated with implementing an arbiter module. Act 302 of flow diagram 300 includes cryptographically binding a true identity for a particular real-world individual to an arbiter module based on identifying information for the particular real-world individual. An individual may utilize their name, birth date, birth location, and/or other identifying information such as social security number, address, driver's license number, passport number, to register and bind their true identity to the arbiter module. Various identification and/or vetting processors may be implemented to facilitate such registration and binding and to ensure that such registration and binding is performed by or on behalf of the particular real-world individual.

Figure 4:
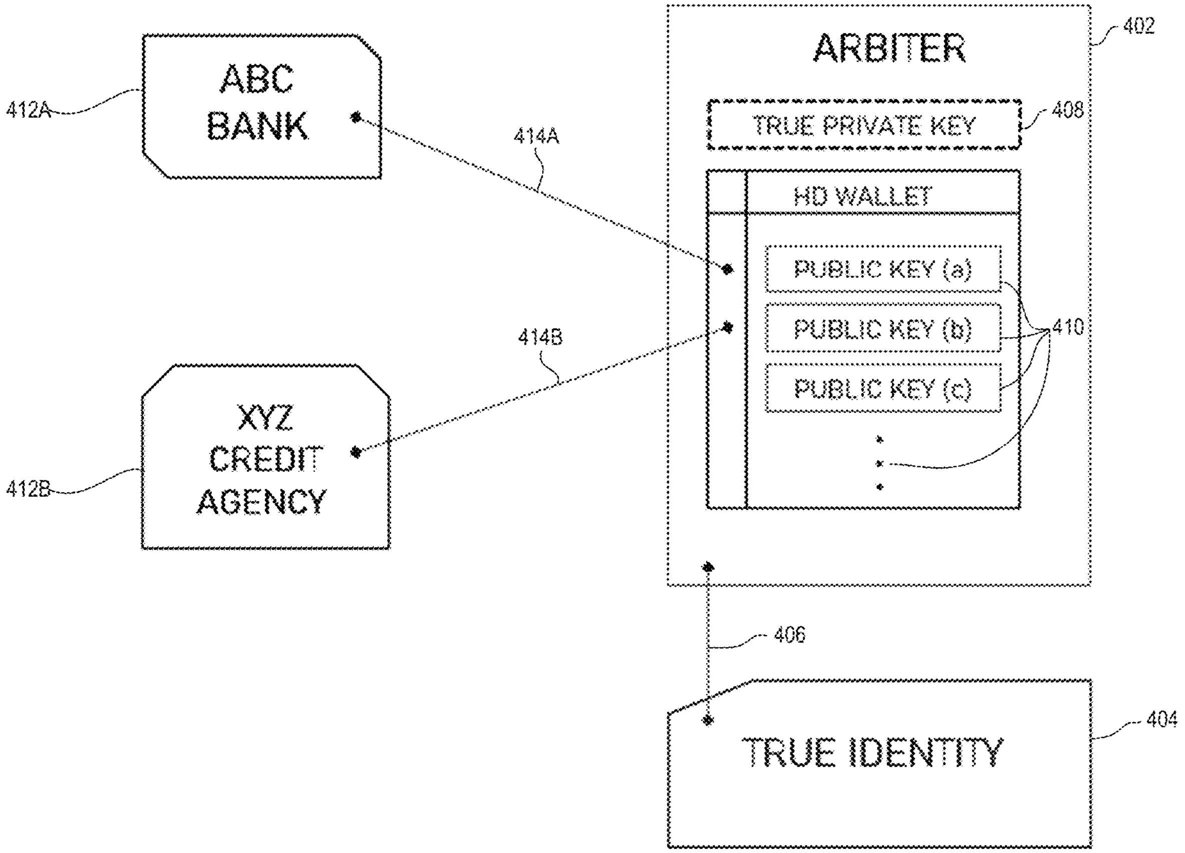
FIG. 4 illustrates a conceptual representation of binding various real-world entities to an arbiter module.

FIG. 4 illustrates a conceptual representation of binding a true identity for a real-world individual to an arbiter module. FIG. 4 illustrates the arbiter module 402 and illustrates a true identity 404 associated with a particular real-world individual. The binding between the arbiter module 402 and the true identity 404 is conceptually represented by the link 406 between the two. Once bound to the arbiter module 402, one or more first private keys 408 may be generated and assigned to the true identity 404. Correspondingly, one or more first public keys 410 may be generated (e.g., utilizing HD wallet techniques/functionality) to allow real-world entities with information pertinent to or associated with the particular real-world individual to communicate such information to the arbiter module 402 for association with the true identity 404, as will be described in more detail below.

Act 304 of flow diagram 300 of FIG. 3 includes cryptographically binding one or more real-world entities to the arbiter module, the one or more real-world entities storing third party information associated with the particular real-world individual. The one or more real-world entities may comprise any type of real-world individuals or organizations. The third-party information associated with the particular real-world individual (which is associated with the true identity bound to the arbiter module) may take on various forms and may indicate various types of real-world information for/about the particular real-world individual that changes and/or can change over time. By way of non-limiting example, the third-party information may comprise information associated with one or more real-world assets of the particular real-world individual and/or information associated with one or more trust metrics for the real-world individual (e.g., credit score, social credit score, etc.). Third party information may be obtained via various affiliations among real-world entities and/or the real-world individual (e.g., the real-world individual may submit authenticated information to a real-world third-party entity, which may be verified and/or stored by the real-world third party).

FIG. 4 illustrates example real-world entities 412A and 412B, which may store third party information for or about the particular real-world individual associated with the true identity 404 (which is bound to the arbiter module 402). The binding between such real-world entities 412A and 412B and the arbiter module 402 is depicted in FIG. 4 via the links 414A and 414B. Such links may be established via cryptographic communication utilizing the one or more first public keys 410.

Act 306 of flow diagram 300 of FIG. 3 includes cryptographically communicating one or more data packages from the one or more real-world entities to the arbiter module, the one or more data packages comprising the third-party information associated with the particular real-world individual. As noted above, such cryptographic communication may be performed utilizing at least the one or more first public keys 410 of the arbiter module 402, which may be generated via HD wallet functionality. Referring again to FIG. 4, PUBLIC KEY (b) of the one or more first public keys 410 may be provided to the real-world entity 412B to enable the real-world entity 412B to provide an encrypted data package to the arbiter module 402, which the arbiter module 402 may interpret via the first private key 408 associated with the true identity 404.

Figure 5:
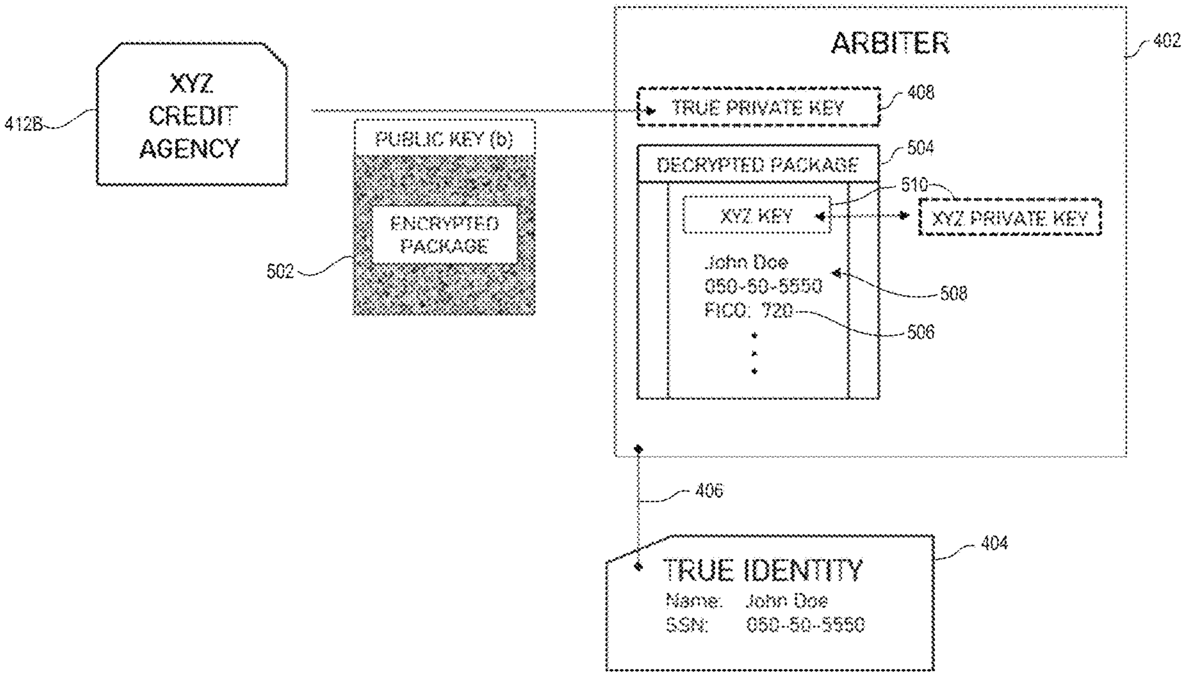
FIG. 5 illustrates a conceptual representation of cryptographically communicating third party information about a particular real-world individual to an arbiter module.

FIG. 5 illustrates an encrypted data package 502 generated by encrypting information associated with the true identity 404 (or associated with the particular real-world individual that pertains to the true identity 404) using PUBLIC KEY (b) (from the one or more first public keys 410 of FIG. 4). FIG. 5 also illustrates a data package 504, which may be generated by decrypting the encrypted data package 502 using the one or more first private keys 408 associated with the true identity 404 (as indicated in FIG. 5 by the arrow extending over the encrypted data package 502 toward the one or more first private keys 408).

As shown in FIG. 5, the (decrypted) data package 504 communicated by the real-world entity 412B includes third party information 506 that is pertinent to the particular real-world individual that is associated with the true identity 404 (in the example of FIG. 5, the particular real-world individual has a name of "John Doe" and a social security number (SSN) of "050-50-5550", as shown in the true identity 404 depicted in FIG. 5). The third-party information 506 shown in FIG. 5 comprises a trust metric associated with the particular real-world individual (e.g., a FICO score of 720). As noted above, third party information 506 may take on various forms.

In some implementations, the data package 504 decrypted via the first private key 408 includes additional information. For instance, FIG. 5 shows an example in which the data package 504 includes identifying information 508 for the particular real-world individual (John Doe), such as, by way of non-limiting example, a name and social security number. Including identifying information 508 for the particular real-world individual associated with the arbiter module 402 may allow for confirmation that the third-party information 506 is accurately pertinent or attributable to the particular real-world individual (John Doe).

As furthermore shown in FIG. 5, a data package may additionally or alternatively include cryptographic proof 510 that may confirm that the encrypted data package 502 from which the (decrypted) data package 504 is generated was genuinely communicated by the real-world entity 412B. The cryptographic proof 510 may take on various forms, such multiple encryption (utilizing a private key associated with the real-world entity 412B), zero-knowledge proof techniques, and/or others.

Accordingly, real-world third-party information pertinent to a particular real-world individual may be associated with a true identity for the particular real-world individual via an arbiter module. Such real-world third-party information may be updated via communication of additional/updated data packages including additional/updated third party information to the arbiter module. As will be described an arbiter module may establish, maintain, and/or update inter-environment information for the true identity associated with the arbiter module (e.g., to track assets and/or trustworthiness of an individual based on actions in multiple environments, such as within the real-world environment and in one or more metaverses). Such inter-environment information may be at least partially based on real-world third-party information.

Act 308 of flow diagram 300 of FIG. 3 includes cryptographically binding one or more metaidentities to the arbiter module, the one or more metaidentities being associated with one or more metaverses, such that the third party information communicated by the one or more real-world entities and associated with the particular real-world individual is at least partially attributable to the one or more metaidentities via the arbiter module for facilitating one or more metaverse actions of the one or more metaidentities within the one or more metaverses without revealing the true identity that is bound to the arbiter module.

Figure 6:
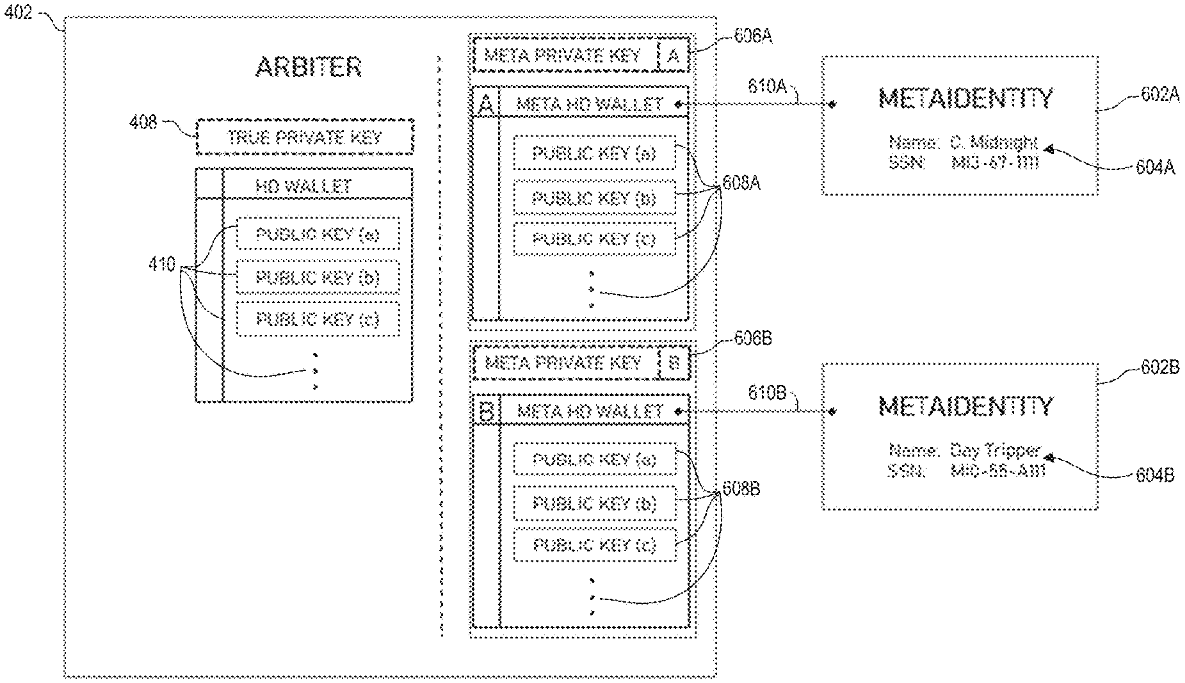
FIG. 6 illustrates a conceptual representation of binding various metaverse identities to an arbiter module.

Binding the one or more metaidentities to the arbiter module may include the performance of various acts, which are conceptually represented in FIG. 6. For instance, FIG. 6 illustrates the arbiter module 402 and various metaidentities 602A and 602B that are associated with a metaverse (or different metaverses). In the example of FIG. 6, binding the various metaidentities 602A and 602B to the arbiter module 402 includes obtaining identifying information 604A and 604B for the metaidentities 602A and 602B (respectively). The identifying information 604A and 604B of FIG. 6 includes a name for each metaidentity 602A and 602B (i.e., "C. Midnight" for metaidentity 602A and "Day Tripper" for metaidentity 602B) and an SSN for each metaidentity (i.e., "M13-67-1111" for metaidentity 602A and "MI0-55-A111" for metaidentity 602B). Additional or alternative identifying information may be utilized to allow the arbiter module 402 to differentiate from among different metaidentities for association with the arbiter module 402 (and the true identity 404). The binding between the arbiter module 402 and the metaidentities 602A and 602B is conceptually shown in FIG. 6 by the links 610A and 610B.

In the example, of FIG. 6, cryptographically binding the metaidentities 602A and 602B to the arbiter module 402 includes generating a private key 606A and 606B and a set of one or more public keys 608A and 608B for each metaidentity 602A and 602B, respectively (e.g., utilizing asymmetric encryption and/or HD wallet techniques). Like the first private key 408 and one or more first public keys 410 generated to facilitate cryptographic communication between real-world entities and the arbiter module 402 (e.g., to communicate information to or from real-world entities that may be pertinent to or that may affect the true identity 404 and/or the metaidentities 602A and 602B), the private keys 606A and 606B and the sets of public keys 608A and 608B may facilitate cryptographic communication between metaverse entities and the arbiter module 402 (e.g., to communicate information to or from metaverse entities that may be pertinent to or that may affect the true identity 404 and/or the metaidentities 602A and 602B). In this way, once a metaidentity is bound to an arbiter module, the arbiter module may communicate and/or translate information (from any environment) to interact with third parties (in any environment) for the benefit of the metaidentity (which may affect the true identity bound to the arbiter module).

Although the present disclosure focuses, in at least some respects, on examples in which a real-world human individual has their true identity bound to an arbiter module (to enable anonymous metaverse activity via one or more metaverse identities also bound to the arbiter module), the principles disclosed herein may extend to implementations in which true identities of other types of real-world individual entities (e.g., individual business/charitable/government organizations) become bound to arbiter modules to facilitate anonymous metaverse activity by the other types of real-world individual entities (e.g., via metaverse identities bound to the same arbiter modules).

Furthermore, although at least some examples discussed herein focus, in at least some respects, on third-party information indicative of values/metrics associated with a particular real-world individual that can readily change over time (e.g., trust metrics, assets), third party information may comprise other types of third-party information for/about the particular real-world individual (e.g., classifications, attributes, criminal conviction status, income status, employment status, marital/familial status, licenses, degrees, qualifications, etc.) that can be stored (and/or verified) by real-world third-party entities and provided to arbiter modules (via binding of the real-world third-party entities to the arbiter modules in accordance with act 304). In some instances, the third-party information may rely at least in part on information provided or made available by the particular real-world individual to the one or more real-world entities Arbiter modules that are bound to true identities (associated with particular real-world individuals) and metaidentities as described herein may be implemented in various ways and/or for various purposes. The following discussion refers to a few example, non-limiting use cases in which an arbiter module bound to a true identity and one or more metaidentites may be utilized.

An arbiter module may operate to transfer correlated data anonymously between environments. As noted above, an arbiter module may maintain or transfer inter-environment information (which may be at least partially based upon the third party information). For instance, an arbiter module may operate in a manner that is agnostic toward the type or purpose of information it maintains or passes and therefore may serve to transmit proof of value or credit. In this way, an arbiter module may be utilized to support and/or enable a metaidentity to autonomously engage in commerce in one or more metaverses in a manner that is supported by an undiscoverable relationship with a true identity.

Figure 7A:
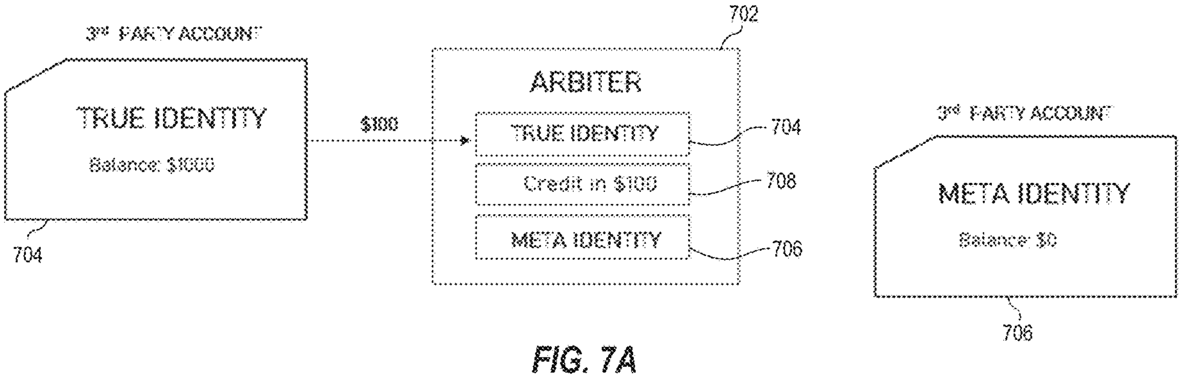
FIGS. 7A and 7B illustrate a conceptual representation of transferring value from a real-world account to a metaidentity account.
Figure 7B:
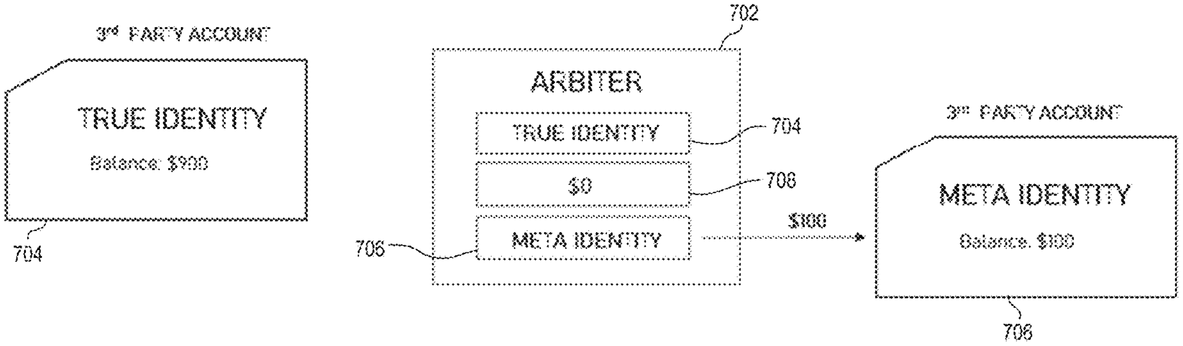

FIGS. 7A and 7B illustrate a conceptual representation of transferring value from a real-world account to a metaidentity account. FIG. 7A illustrates an example transfer of value of $100 from an available balance of $1000 maintained by a real-world 3$^{rd}$ party account for a true identity 704 bound to an arbiter module 702. The real-world value ($100) indicated as available to the true identity 704 may comprise third party information communicated to the arbiter module 702 by the real-world 3$^{rd}$ party account as discussed hereinabove. The transfer of the $100 from real-world assets/value for attribution to metaidentities for use in metaverse environments may be tracked by the arbiter module 702 in the form of inter-environment information 708 (shown in FIG. 7A as a credit in $100), which is based on the third-party information.

FIG. 7B illustrates an example subsequent allocation of the value of $100 from the arbiter module 702 to a metaverse 3$^{rd}$ party account associated with a metaidentity 706 that is bound to the arbiter module 702 (and therefore anonymously associated with the true identity 704 and its corresponding real-world information). The real-world available balance maintained by the real-world 3$^{rd}$ party account is updated (to $900) to reflect the transfer of $100 therefrom (e.g., based on communication between the arbiter module 702 and the real-world 3$^{rd}$ party account). As shown in FIG. 7B, the available balance of the metaverse 3$^{rd}$ party account associated with the metaidentity 706 is updated (to $100) to reflect the allocated value. The inter-environment information 708 maintained by the arbiter module 702 is also updated (to $0) to reflect the allocation of value to the metaverse 3$^{rd}$ party account.

Because of the arbiter module 702, the value transfer shown in FIGS. 7A and 7B from the real-world 3$^{rd}$ party account to the metaverse 3$^{rd}$ party account may be performed in a manner that maintains the anonymity of the real-world source of the value (from the perspective of 3$^{rd}$ party metaverse entities).

Figure 8:
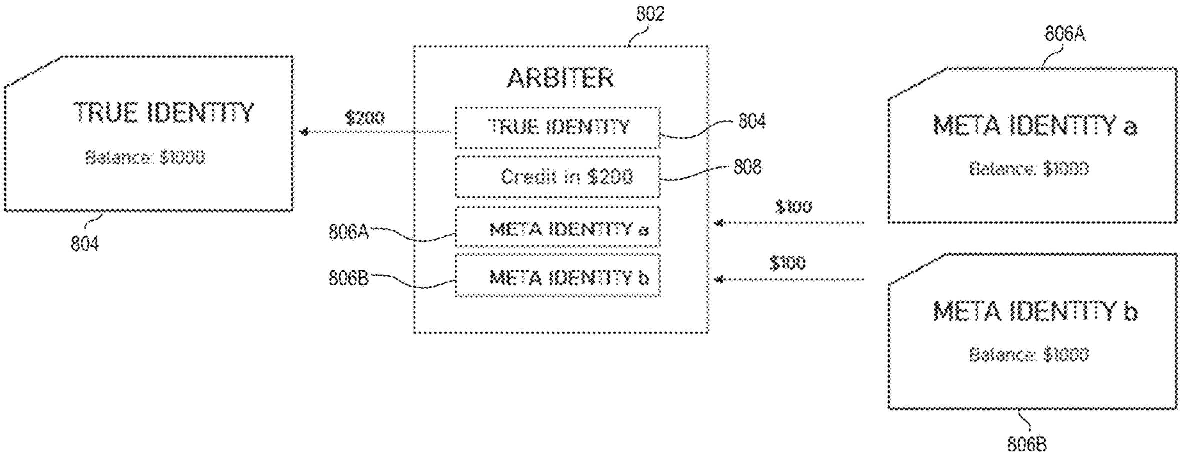
FIG. 8 illustrates a conceptual representation of transferring value from a metaidentity account to a real-world account.

FIG. 8 illustrates a conceptual representation of transferring value from a metaidentity account to a real-world account. FIG. 8 illustrates value ($100) transferred from a metaverse account for metaidentity 806A to an arbiter module 802 to which the metaidentity 806A is bound. Similarly, FIG. 8 illustrates value ($100) transferred from a metaverse account for metaidentity 806B to the arbiter module 802 to which the metaidentity 806B is also bound to the arbiter module 802. The arbiter module 802 tracks these value transfers via inter-environment information 808, showing credit in $200 in the example of FIG. 8. In this regard, the inter-environment information 808 may be updated based on metaverse actions (e.g., in addition to real-world actions).

FIG. 8 also illustrates the value $200 transferred from the arbiter module 802 to a real-world account for true identity 804 that is bound to the arbiter module 802. In this regard, one or more aspects of the inter-environment information 808 may be communicated to real-world entities (e.g., to communicate a transfer of value from an arbiter module to a real-world entity). The arbiter module 802 may maintain the anonymity of the metaidentities 806A and 806B and/or accounts therefor (the source of the value) in transferring the value from the arbiter module 802 to the real-world account for the true identity 804.

Figure 9:
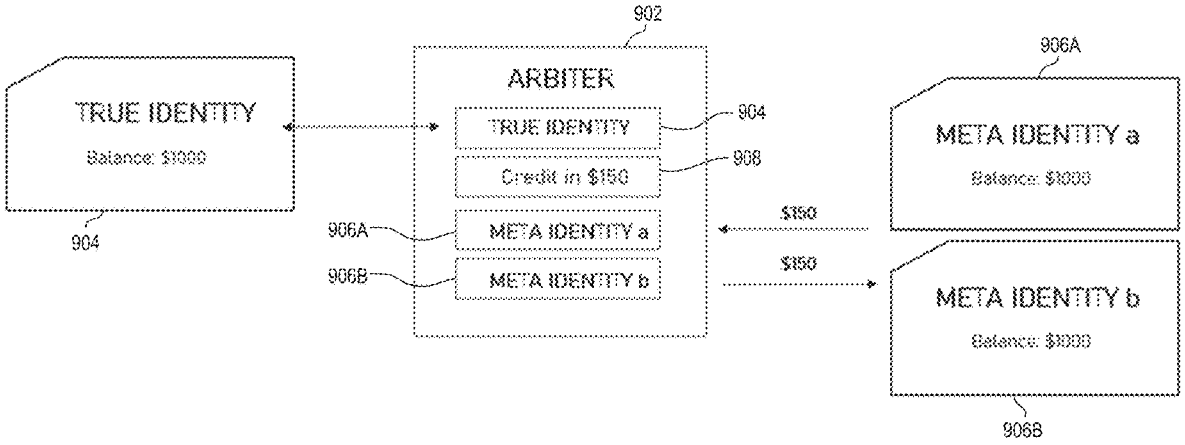
FIG. 9 illustrates a conceptual representation of transferring value between metaidentity accounts.

An arbiter module may similarly facilitate transfers of value between metaverse accounts for metaidentities that are bound to the arbiter module (whether intra-metaverse or inter-metaverse). FIG. 9 illustrates a conceptual representation of transferring value between metaidentity accounts. In particular, FIG. 9 illustrates a transfer of $150 of value ($150) from a metaverse account for metaidentity 906A to an arbiter module 902 (which transfer is tracked in the form of information 908 showing credit in $150 in the example of FIG. 9) and from the arbiter module 902 to a metaverse account for metaidentity 906B (without affecting real-world value for real-world accounts for true identity 904). The arbiter module 902 may maintain the anonymity of metaidentity 906A and/or the metaverse account therefor (the source of the value) in transferring the value from the arbiter module 902 to the metaverse account for metaidentity 906B. The information 908 may comprise intra-environment information when both metaidentities 906A and 906B are in the same metaverse or inter-environment information when the metaidentities 906A and 906B are in different metaverses.

The functionality of an arbiter module may comprise intermediary functionalities as described hereinabove, which may be distinct from account storage functions that may be performed by third parties (e.g., value storage and transactions is often encumbered by significant regulations). In some instances, a reference to actions of an arbiter module may be sufficient to satisfy know your customer (KYC) mandates, allowing an arbiter module to serve as a storage of value to facilitate account services.

Figure 10:
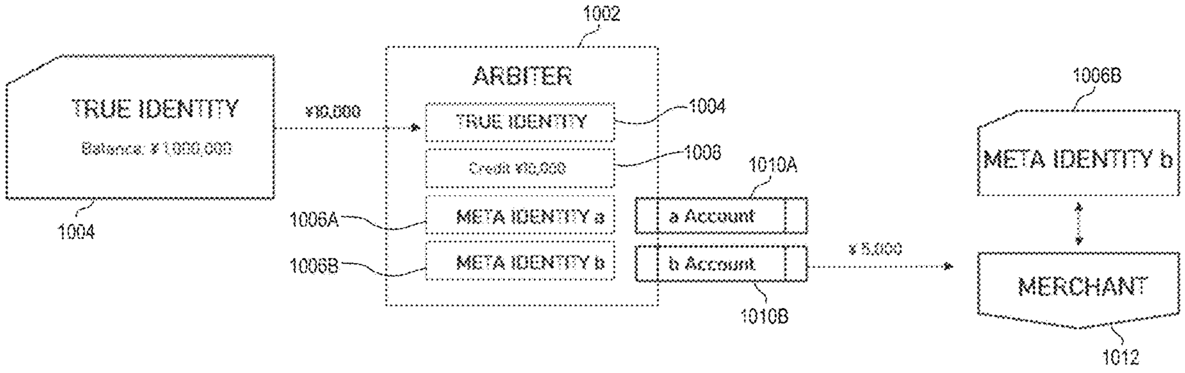
FIG. 10 illustrates a conceptual representation of an arbiter module acting as a repository for multiple metaidentities.

For example, FIG. 10 illustrates a conceptual representation of an arbiter module acting as a repository for multiple metaidentities. In particular, FIG. 10 illustrates a transfer of value (¥10,000 of an available ¥1,000,000 in a real-world account for a true identity 1004 bound to the arbiter module 1002) to the arbiter module 1002, which transfer is reflected in the inter-environment information 1008 of the arbiter module 1002 showing a credit of ¥10,000. The arbiter module is bound to metaidentity 1006A and metaidentity 1006B, which are associated with accounts 1010A and 1010B, respectively, for interacting with metaverse entities. The accounts 1010A and 1010B may have shared access to the credit of ¥10,000 indicated as available by the inter-environment information 1008 (and actually stored by the arbiter module 1002 in some embodiments). In this way, a debit from either account 1010A or 1010B would affect the remaining value available to both accounts 1010A and 1010B. As shown in FIG. 10, the arbiter module 1002 may transfer value (¥5,000) from account 1010B to a metaverse merchant 1012 interacting with metaidentity 1006B within the metaverse.

Accordingly, an arbiter module may have the functionality to operate as a financial repository; exchange/transfer funds across environments (or within common environments); and/or exchange/transfer funds within metaverse environments (and/or as an exchange to convert value types).

As noted above, third party information pertinent to a true identity bound to an arbiter module may take on various forms, such as one or more trust metrics or other indications of trust for the true identity. In this regard, an arbiter module may be configured to communicate third party information to one or more metaverse entities seeking interaction with a metaidentity bound to the arbiter module (and therefore bound to the true identity associated with the third-party information).

By way of illustrative example, a credit issuer with legacy systems may require specific identity information to support system requirements and regulation for issuing credit. In providing the requested data, a metaidentity could provide the following information:

Name: Captain Midnight
Address: 123 Metaverse Way, Mars.
SSN: MI3-67-1111
Email: CMidnight@private.com
Phone: 555-867-5309

Because the virtual data is fictitious (e.g., being irrelevant to the real-world environment), it would be highly unlikely that this information alone would be sufficient to enable the credit issuer to extend credit. However, with the addition of a credit worthiness metric positively tied to a true person (e.g., a credit score for a particular real-world individual in the form of third party information provided by a real-world third party bound to an arbiter module that is also bound to (i) the particular real-world individual whom the credit score is for and to (ii) the metaidentity requesting credit in a metaverse), meaningful assessment of credit worthiness of the metaidentity becomes possible.

Figure 11:
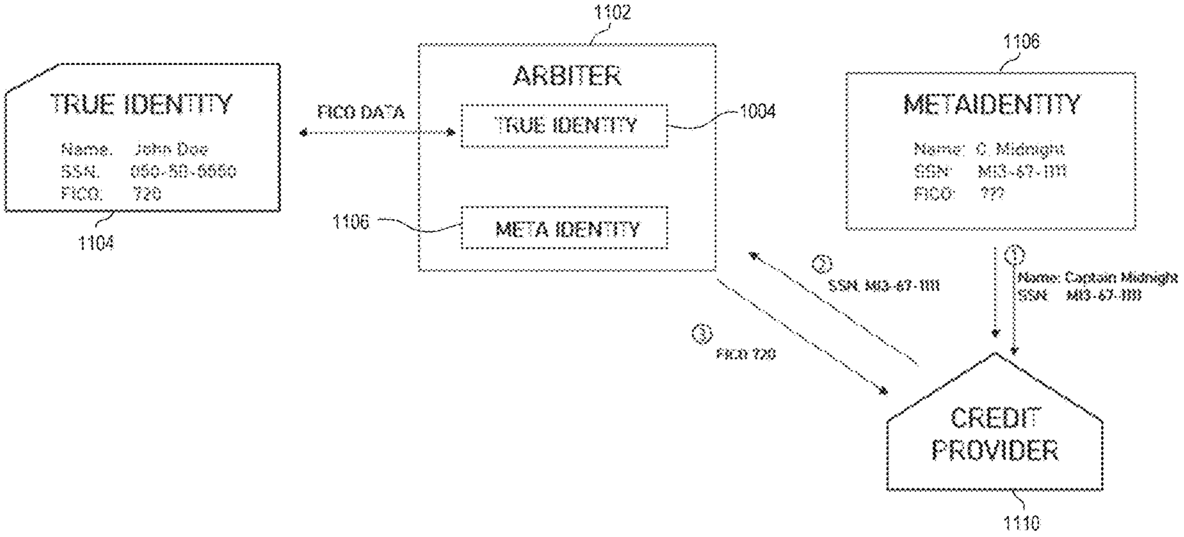
FIG. 11 illustrates a conceptual representation of acts associated with an example of providing third party information for a true identity to a metaverse entity interacting with a metaidentity that is bound to the same arbiter module as the true identity.

FIG. 11 illustrates an arbiter module 1102 bound to a true identity 1104 (for a particular real-world individual named “John Doe” with an SSN of “050-50-5550”) and a metaidentity 1106 (following from the above example, named “C. Midnight” with a virtual SSN of “MI3-67-1111”).

As shown in FIG. 11, the true identity 1104 bound to the arbiter module 1102 is associated with a FICO score of 720, which may be cryptographically communicated to the arbiter module 1102 by a real-world entity in the form of third-party information as discussed hereinabove (indicated by the double-headed arrow labeled “FICO DATA” in FIG. 11). As noted above, the metaidentity 1106 is bound to the arbiter module 1102 and is therefore indirectly bound to the true identity 1104. Thus, third party information for the true identity 1104 is at least partially attributable to the metaidentity 1106. The arbiter module 1102 may communicate the third-party information descriptive of the true identity 1104 (e.g., the FICO score of 720) to a metaverse entity 1110 seeking to interact with the metaidentity 1106 that is bound to the same arbiter module 1102 as the true identity 1104. Such a revelation of the third-party information may communicate to the metaverse entity 1110 the real-world trustworthiness of the real-world individual (embodied in true identity 1104) that underlies the metaidentity 1106 (by mutual binding to the arbiter module 1102), thereby allowing the metaverse entity 1110 to make an informed decision about their interaction with the metaidentity 1106 (e.g., whether to extend credit).

FIG. 11 illustrates various example acts associated with an example of providing third party information for a true identity to a metaverse entity interacting with a metaidentity that is bound to the same arbiter module as the true identity. Act (1) includes the metaidentity 1106 seeking credit from the metaverse entity 1110 using information associated with the metaidentity 1106 within the metaverse (e.g., the name “C. Midnight” and the virtual SSN “MI3-67-1111”). Act (2) includes the metaverse entity 1110 querying the arbiter module 1102 using the information associated with the metaidentity 1106 to obtain additional information concerning the metaidentity 1106 (e.g., third party information associated with a real-world individual that underlies or backs the metaidentity 1106 by associated with the common arbiter module 1102). Act (3) includes the arbiter module 1102 providing the third-party information associated with the true identity (e.g., the FICO score of 720) to the metaverse entity 1110.

The provision of the real-world third-party information to the metaverse entity 1110 can indicate to the metaverse entity 1110 that the true backer of the metaidentity 1106 (“C. Midnight”) is trustworthy enough to risk extending credit to metaidentity 1106. With such functionality, a metaidentity could then engage in virtual commerce within the metaverse and develop a credit history apart from, yet grounded to, the corresponding credit history of the true persona. Credit history and/or other aspects of actions performed by a metaidentity may be tracked by an arbiter module, as noted above. In some implementations, an arbiter module may convey such information about a metaidentity's performance (e.g., payment or default) back to one or more real-world third parties that track information associated with the true identity (e.g., a credit bureau), allowing actions or omissions within the metaverse to have real-world consequences or benefits.

Relevant actions, omissions, and/or other events in different environments (e.g., in the real-world environment and/or in metaverse environments) may be tracked by an arbiter module for the various identities bound thereto in the form of inter-environment information. Such inter-environment information may be communicated to real-world and/or metaverse third parties for various purposes (e.g., for entities to determine creditworthiness, asset verification, etc.).

Figure 12:
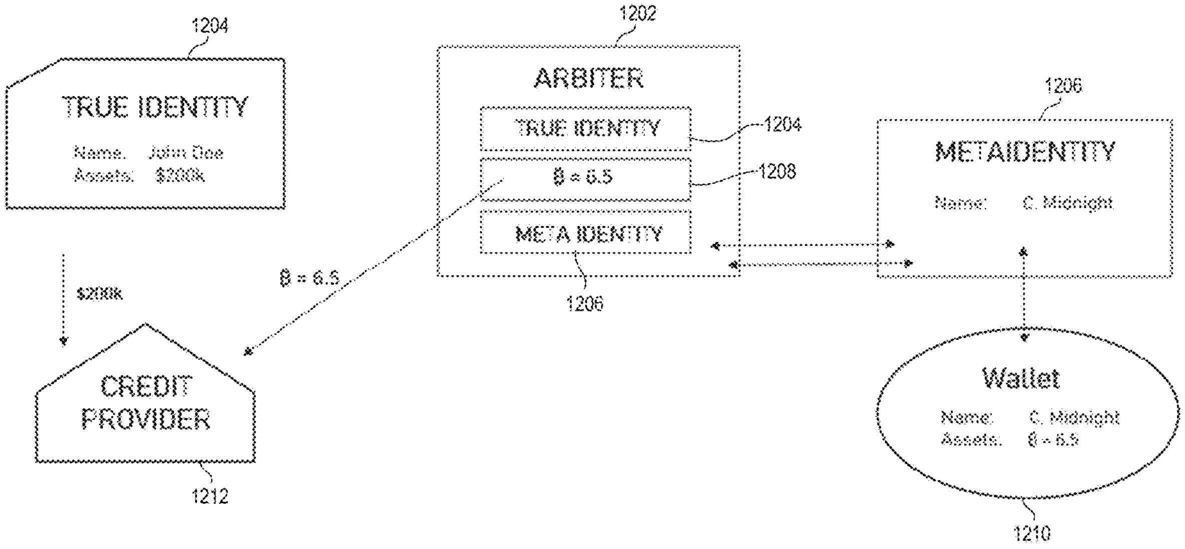
FIG. 12 illustrates a conceptual representation of communicating information about metaverse assets to a real-world entity via an arbiter module.

Assets and/or activities may additionally or alternatively be communicated between environments utilizing an arbiter module. FIG. 12 illustrates a conceptual representation of communicating information about metaverse assets to a real-world entity via an arbiter module. FIG. 12 illustrates a true identity 1204 and a metaidentity 1206 bound to an arbiter module 1202. The true identity 1204 (“John Doe”) bound to the arbiter module 1202 may have real-world assets associated therewith, such as “$200k” as shown in the example of FIG. 12. Similarly, the metaidentity 1206 (“C. Midnight”) that is also bound to the arbiter module 1202 may have metaverse assets associated therewith, such as “₿=6.5” stored within a wallet 1210 of the metaidentity 1206 as shown in the example of FIG. 12. The metaverse assets (and/or the real-world assets) may be tracked by the arbiter module 1202 in the form of inter-environment information 1208.

As noted above, the inter-environment information 1208 maintained by the arbiter module 1202 may be communicated to real-world entities (and/or metaverse entities). In the example of FIG. 12, the arbiter module 1202 communicates the inter-environment information 1208 indicating the assets of the metaidentity 1206 associated with the true identity 1204 ("฿ =6.5") to a real-world entity 1212 seeking to verify assets of or attributable to the true identity 1204 (as indicated in FIG. 12 by the arrow extending from the inter-environment information 1208 to the real-world entity 1212.

The true identity 1204 ("John Doe") may similarly communicate information about real-world assets ($200k) to the real-world entity 1212 (and/or one or more metaverse entities), thereby allowing the real-world entity 1212 to verify total assets and/or liabilities (both real-world and metaverse assets and/or liabilities) of or attributable to the true identity 1204. In some instances, information about real-world assets is additionally reflected in the inter-environment information 1208 and may be communicated by the arbiter module 1202 to the real-world entity 1212 (and/or one or more metaverse entities).

Figure 13:
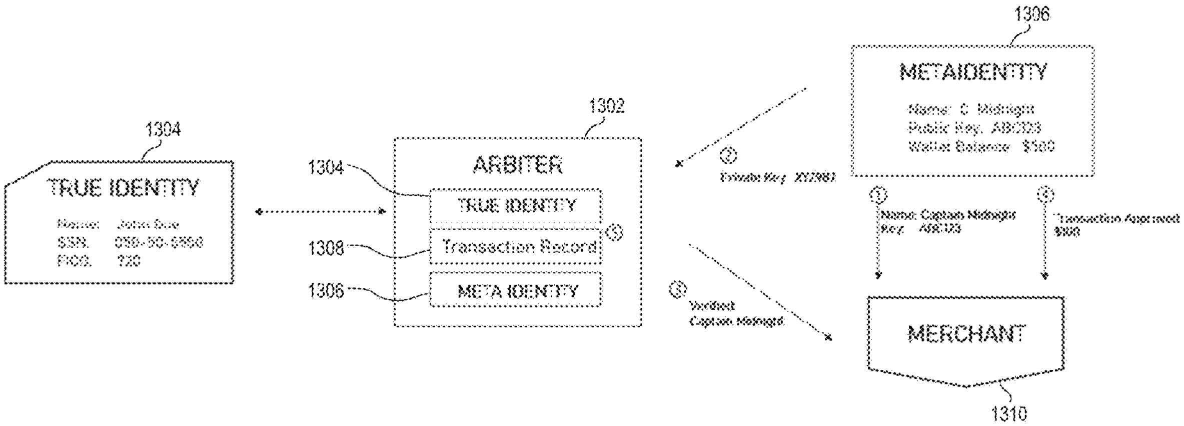
FIG. 13 illustrates a conceptual representation of acts associated with an example of an arbiter module maintaining action records that attribute metaverse actions performed via one or more metaidentities to a true identity.

In many commercial interactions, it is advantageous for at least one party to confirm another's identity (e.g., for purposes of legal attribution). In some implementations, an arbiter module as described herein can be leveraged by entities in any environment to validate identity and attribute actions. FIG. 13 illustrates a conceptual representation of acts associated with an example of an arbiter module maintaining action records that attribute metaverse actions performed via one or more metaidentities to a true identity.

In particular FIG. 13 illustrates a true identity 1304 and a metaidentity 1306 bound to a common arbiter module 1302. In the example of FIG. 13, the metaidentity 1306 interacts with a metaverse entity 1310, and the arbiter module 1302 maintains a transaction record in the form of inter-environment information 1308. The transaction record provides a record of interactions made between the metaidentity 1306 and the metaverse entity 1310 and attributes actions of the metaidentity 1306 to the true identity 1304 in a secure manner. Such records may be accessed to discern the association between metaverse activity and a true identity, by way of non-limiting example, in cases of criminal activity, fraud, and/or in response to lawful demands of a government or regulatory entity.

Act (1) of FIG. 13 includes the metaidentity 1306 seeking to interact with the metaverse entity and providing identifying information such as the name of the metaidentity ("C. Midnight") and/or a public key of the metaidentity 1306 ("ABC123"). Act (2) of FIG. 13 includes the metaidentity 1306 passing a private key therefor ("XYZ987") to the arbiter module 1302 for forwarding of cryptographically verified identity information to the metaverse entity 1310. Act (3) includes the arbiter module passing the cryptographically verified identity information to the metaverse entity 1310. Based on such verification, the metaverse entity 1310 may proceed with the interaction with the metaidentity 1306 in accordance with act (4). Act (5) of FIG. 13 includes establishing or maintaining the transaction record (e.g., in the form of inter-environment information 1308), which may be used to log the activity and/or verification of the metaidentity 1306 for attribution to the true identity 1304 should the need arise.

Various types of data may be stored utilizing an arbiter module as discussed herein, such as transactional data (for legal and/or regulatory purposes, as discussed with reference to FIG. 13). Additional or alternative data that may be stored by an arbiter module may include true identity data, such as recent, cumulative, or average values of data associated with a true identity (e.g., third party information, inter-environment information). Storage of such data may advantageously shorten processing time, reduce data requests/traffic, and/or provide broader understanding of the real-world individual that underlies the true identity. For example, if a credit score were reported to one third party several minutes before a second request from another, the second requestor may be satisfied with the recent data, particularly if it were offered with less delay or expense. In an example of data aggregation, the arbiter module could store bank balance information obtained by way of previous requests over a set period of time to give future requestors better insight into the fiscal profile of the true identity.

Data stored by an arbiter module may additionally or alternatively include metaidentity data, such as recent, cumulative, or average values of data associated with a metaidentity (e.g., inter-environment information). Such data may enable development of informative insights or ratings on conduct of metaidentities.

In some implementations, an arbiter module may manage or potentially issue unique virtual data for integration with legacy systems, which often require data such as mailing addresses, government identification numbers, and/or dates of birth to function. For example, in the United States, the Social Security Number (SSN) is often required to register for various services. An arbiter module may be configured to issue unique analogs for SSNs that are cryptographically verifiable and uniquely associated with particular metaidentities (as shown in examples discussed hereinabove). In the example of a hard address, an arbiter module may issue exclusive virtual PO box or street addresses that can be verifiably attributed to specific metaidentities.

In some implementations, an arbiter module may anonymously relay internet traffic, phone calls, SMS texts, emails, and/or other real-time or synchronous or asynchronous communications. In some instances, the arbiter module could issue meta-phone numbers that, when called, would relay the caller to an individual's real-world personal number without revealing the ultimate destination to the caller.

In some implementations, an arbiter module may facilitate data passage concerning physical addressing for a re-shipper. For instance, a product sent to a metaverse address provided by an arbiter module may in reality be an intermediate physical location designed for the repackaging and follow-on reshipment to an end-user's desired location.

In some implementations, an arbiter module may serve as a bridging mechanism between environments to correlate meta and real-world activities to comply with legislation related to social credit systems.

As noted above, although an arbiter module may serve data transfer/translation functions, an arbiter module may serve one or more intermediary functions, such as hosting a monetary account with a financial institution for the purposes of receiving deposits for eventual transition for credit to metaidentities. An arbiter module may additionally or alternatively be used by third parties seeking true identity confirmation. For instance, in place of conducting a traditional identity verification process on an individual for a true-name purpose, a third party could leverage the true entity binding process (e.g., discussed hereinabove with reference to FIGS. 3 and 4) and simply confirm identity through a private/public key paring.

Binding between a metaidentity and an arbiter module may comprise a perpetual binding (e.g., maintained unless explicit disassociation or unbinding occurs) or temporary binding (e.g., for one-time transactions or "snap" transactions, without performance of formal identity verification processes). Temporary binding for "snap" transactions may enable metaverse entities to receive verifying information about a metaidentity on an ad hoc basis.

Figure 14:
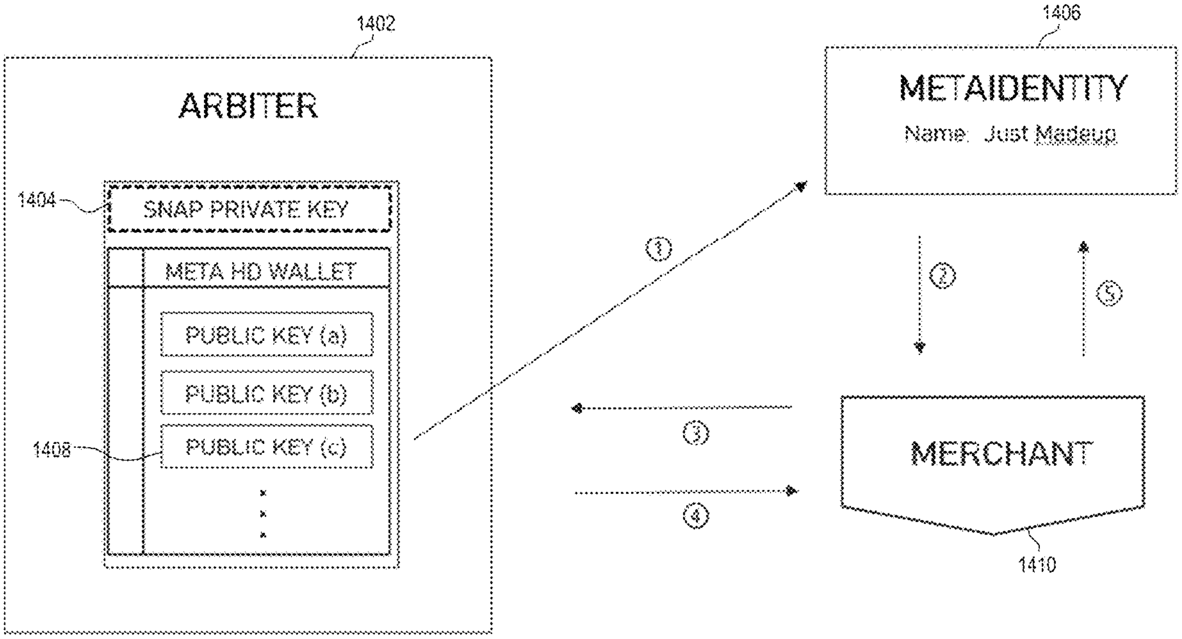
FIG. 14 illustrates a conceptual representation of acts associated with an example of facilitating temporary binding of a metaidentity to an arbiter module to facilitate an ad hoc transaction.

FIG. 14 illustrates a conceptual representation of acts associated with an example of facilitating temporary binding of a metaidentity to an arbiter module to facilitate an ad hoc transaction. FIG. 14 illustrates an arbiter module 1402, a metaidentity 1406, and a metaverse entity 1410 seeking an ad hoc transaction with the metaidentity 1406 that is not perpetually bound to the arbiter module 1402. The arbiter module 1402 of FIG. 14 is bound to a true identity (not shown), as indicated by the presence of the first private key 1404 in association with the arbiter module 1402 in FIG. 14. Act (1) of FIG. 14 includes generating and providing a one-time public key 1408 to the metaidentity 1406 for the ad hoc transaction between the metaidentity 1406 and the metaverse entity 1410. Act (2) of FIG. 14 includes the metaidentity 1406 passing the public key 1408 to the metaverse entity 1410, along with one or more transaction particulars (e.g., terms and/or obligations of the transaction) for the ad hoc transaction. In act (3) of FIG. 14, the metaverse entity passes the public key, along with the transaction particulars, to the arbiter module 1402 for confirmation, and act (4) includes the arbiter module 1402 confirming the authenticity of the ad hoc transaction and sending value to the metaverse entity 1410 on behalf of the metaidentity 1406. Act (5) of FIG. 14 includes the metaverse entity 1410 settling the ad hoc transaction with the metaidentity 1406 in accordance with the transaction particulars.

The acts discussed herein may be practiced by a computer system including one or more processors and computer-readable media such as computer memory (e.g., physical hardware storage devices). In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud- and remote-based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for facilitating anonymous metaverse actions, comprising:

one or more processors; and one or more non-transitory computer-readable storage media having stored thereon executable instructions that when executed by the one or more processors configure the computer system to:

cryptographically bind a true identity for a particular real-world individual to an arbiter module based on identifying information for the particular real-world individual;

cryptographically bind one or more real-world entities to the arbiter module, the one or more real-world entities storing real-world third party information associated with the particular real-world individual;

cryptographically receive one or more data packages from the one or more real-world entities, the one or more data packages comprising the real-world third-party information associated with the particular real-world individual;

cryptographically bind one or more metaidentities to the arbiter module, the one or more metaidentities being associated with one or more metaverses, such that the real-world third party information communicated by the one or more real-world entities and associated with the particular real-world individual is at least partially attributable to the one or more metaidentities via the arbiter module; and facilitating one or more metaverse actions of the one or more metaidentities via communicating the real-world third-party information within the one or more metaverses without revealing the true identity that is bound to the arbiter module;

wherein the facilitating comprises: communicating, via the arbiter module, to one or more requesting entities, real-world or metaverse third-party information comprising one or more externally generated trust metrics associated with a corresponding identity; and wherein the arbiter module is configured to selectively transmit at least a portion of the one or more externally generated trust metrics to the one or more requesting entities without disclosing the true identity ultimately associated with the corresponding identity.

2. The computer system as recited in claim 1, wherein the executable instructions configure the computer system to:

generate a first private key and one or more first public keys associated with the true identity bound to the arbiter module;

provide the one or more first public keys to the one or more real-world entities;

obtain one or more encrypted data packages from the one or more real-world entities, the one or more encrypted data packages being encrypted using the one or more first public keys; and generate the one or more data packages by decrypting the one or more encrypted data packages utilizing the first private key.

3. The computer system as recited in claim 2, wherein generating the one or more first public keys utilizes hierarchical deterministic wallet techniques.

4. The computer system as recited in claim 1, wherein the one or more data packages further comprise identifying information for the particular real-world individual for confirming accurate association between the real-world third party information communicated by the one or more real-world entities and the particular real-world individual.

5. The computer system as recited in claim 1, wherein the one or more data packages further comprise cryptographic proof confirming genuine communication of the one or more data packages by the one or more real-world entities.

6. The computer system as recited in claim 1, wherein the executable instructions for cryptographically binding the one or more metaidentities to the arbiter module include instructions that are executable to configure the computer system to:

obtain respective identifying information for each of the one or more metaidentities;

generate a respective private key for each metaidentity of the one or more metaidentities; and generate a respective set of one or more public keys for each metaidentity of the one or more metaidentities.

7. The computer system as recited in claim 6, wherein generating the respective sets of one or more public keys utilizes hierarchical deterministic wallet techniques.

8. The computer system as recited in claim 1, wherein the real-world third party information comprises information associated with one or more real-world assets of the particular real-world individual or information associated with one or more trust metrics for the particular real-world individual.

9. The computer system as recited in claim 1, wherein the arbiter module maintains inter-environment information, and wherein the inter-environment information is at least partially based upon the real-world third-party information.

10. The computer system as recited in claim 9, wherein the executable instructions include instructions that are executable to configure the computer system to update the inter-environment information based upon one or more additional data packages communicated from the one or more real-world entities to the arbiter module, the one or more additional data packages comprising updated real-world third party information.

11. The computer system as recited in claim 9, wherein the executable instructions include instructions that are executable to configure the computer system to update the inter-environment information based upon the one or more metaverse actions of the one or more metaidentities within the one or more metaverses.

12. The computer system as recited in claim 11, wherein the executable instructions include instructions that are executable to configure the computer system to communicate one or more aspects of the inter-environment information to the one or more real-world entities.

13. The computer system as recited in claim 9, wherein the one or more metaverse actions comprise communicating, via the arbiter module, one or more aspects of the inter-environment information to one or more metaverse entities seeking interaction with at least one of the one or more metaidentities.

14. The computer system as recited in claim 1, wherein the one or more metaverse actions comprise allocating, via the arbiter module, one or more resources indicated as available to the particular real-world individual by the real-world third party information to at least one of the one or more metaidentities.

15. The computer system as recited in claim 1, further comprising securely maintaining, via the arbiter module, action records that attribute metaverse actions performed via the one or more metaidentities to the true identity.

16. The computer system as recited in claim 1, wherein the executable instructions configure the computer system to apply one or more cryptographic techniques to establish a secure communication capability among the arbiter module and the one or more real-world entities or the one or more metaidentities, thereby cryptographically associating each while maintaining confidentiality and integrity of information exchanged, recovery of the information being limited through possession of a corresponding private cryptographic key or other requisite cryptographic credential established by agreement between the arbiter module and the one or more real-world entities or the one or more metaidentities.

17. The computer system as recited in claim 1, wherein the facilitating comprises communicating, from the arbiter module to a requesting metaverse entity, the real-world third party information, the real-world third party information comprising an externally generated trust metric descriptive of a trustworthiness of the true identity, the trust metric being transmitted to the requesting metaverse entity.

18. A computer-implemented method for facilitating anonymous metaverse actions, comprising:

cryptographically binding a true identity for a particular real-world individual to an arbiter module based on identifying information for the particular real-world individual;

cryptographically binding one or more real-world entities to the arbiter module, the one or more real-world entities storing real-world third party information associated with the particular real-world individual;

cryptographically receiving one or more data packages from the one or more real-world entities, the one or more data packages comprising the real-world third-party information associated with the particular real-world individual;

cryptographically binding one or more metaidentities to the arbiter module, the one or more metaidentities being associated with one or more metaverses, such that the real-world third party information communicated by the one or more real-world entities and associated with the particular real-world individual is at least partially attributable to the one or more metaidentities via the arbiter module; and facilitating one or more metaverse actions of the one or more metaidentities via communicating the real-world third-party information within the one or more metaverses without revealing the true identity that is bound to the arbiter module;

wherein the facilitating comprises: communicating, via the arbiter module, to one or more requesting entities, real-world or metaverse third-party information comprising one or more externally generated trust metrics associated with a corresponding identity; and wherein the arbiter module is configured to selectively transmit at least a portion of the one or more externally generated trust metrics to the one or more requesting entities without disclosing the true identity ultimately associated with the corresponding identity.

19. The computer-implemented method as recited in claim 18, wherein cryptographically receiving further comprises:

generating a first private key and one or more first public keys associated with the true identity bound to the arbiter module;

providing the one or more first public keys to the one or more real-world entities;

obtaining one or more encrypted data packages from the one or more real-world entities, the one or more encrypted data packages being encrypted using the one or more first public keys; and generating the one or more data packages for the arbiter module by decrypting the one or more encrypted data packages utilizing the first private key.

20. The computer-implemented method as recited in claim 18, wherein the facilitating comprises communicating, from the arbiter module to a requesting metaverse entity, the real-world third party information comprising data descriptive of the true identity in connection with the one or more metaidentities.

21. A computer-implemented method for facilitating anonymous metaverse actions, comprising:

cryptographically binding a true identity for a particular real-world individual to an arbiter module based on identifying information for the particular real-world individual;

cryptographically binding one or more real-world entities to the arbiter module, the one or more real-world entities storing real-world third party information associated with the particular real-world individual;

cryptographically receiving one or more data packages from the one or more real-world entities, the one or more data packages comprising the real-world third-party information associated with the particular real-world individual;

cryptographically binding one or more metaidentities to the arbiter module, the one or more metaidentities being associated with one or more metaverses, such that the real-world third party information communicated by the one or more real-world entities and associated with the particular real-world individual is at least partially attributable to the one or more metaidentities via the arbiter module;

facilitating one or more metaverse actions of the one or more metaidentities via communicating the real-world third-party information within the one or more metaverses without revealing the true identity that is bound to the arbiter module; and applying one or more cryptographic techniques to establish a secure communication capability among the arbiter module and the one or more real-world entities or the one or more metaidentities, thereby cryptographically associating each while maintaining confidentiality and integrity of information exchanged, recovery of the information being limited through possession of a corresponding private cryptographic key or other requisite cryptographic credential established by agreement between the arbiter module and the one or more real-world entities or the one or more metaidentities.

* * * * *